Figure 1:
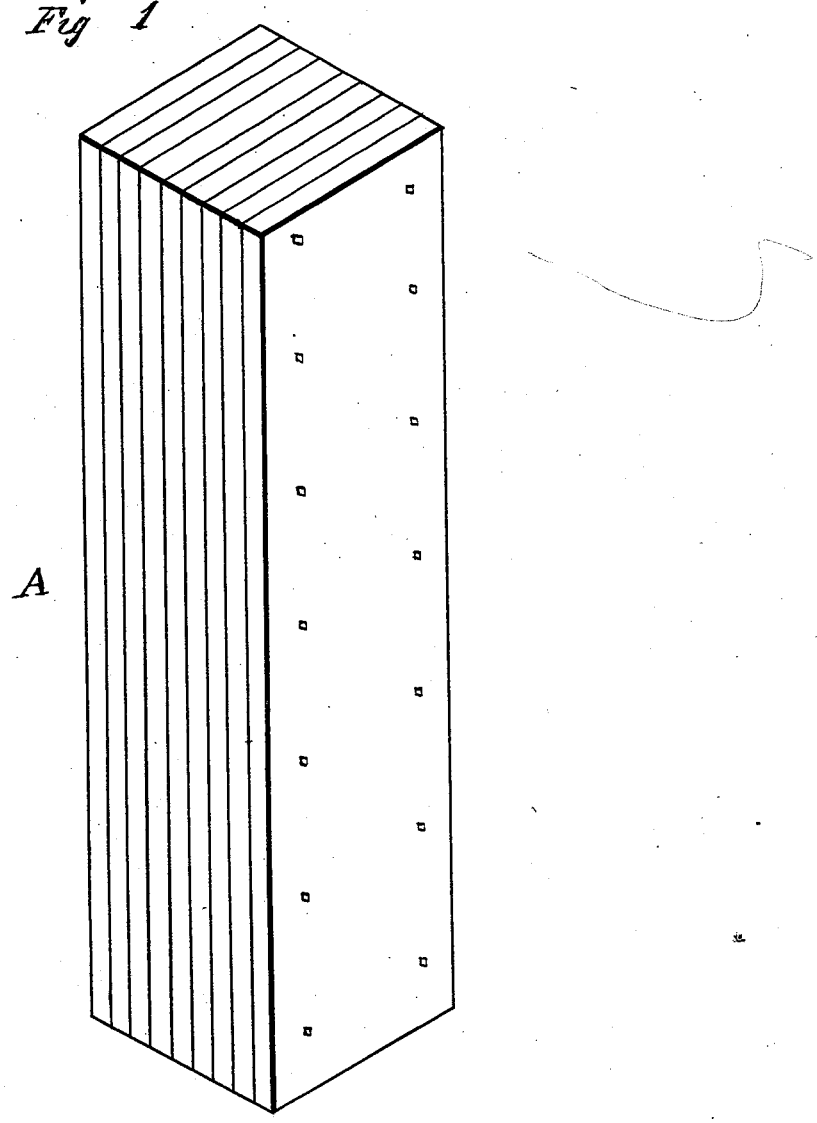

2 Sheets--Sheet 1.

C. A. JEWELL.
Machine Belting.

No. 164,002. Patented June 1, 1875.

A

Witnesses
S. D. Raymond
Jeremy W. Ships

Inventor.
Charles A. Jewell

2 Sheets--Sheet 2.

C. A. JEWELL.
Machine Belting.

No. 164,002. Patented June 1, 1875.

Witnesses

Inventor,
Charles A. Jewell

UNITED STATES PATENT OFFICE.

CHARLES A. JEWELL, OF HARTFORD, CONNECTICUT.

IMPROVEMENT IN MACHINE-BELTINGS.

Specification forming part of Letters Patent No. 164,002, dated June 1, 1875; application filed May 24, 1875.

*To all whom it may concern:*

Be it known that I, CHARLES A. JEWELL, of the city and county of Hartford and State of Connecticut, have invented certain new and useful Improvement in Belting for operating machinery; and to enable others skilled in the art to make and use the same, I will proceed to describe, referring to the drawings, in which the same letters indicate like parts in each of the figures.

The nature of this invention consists in making a belt about square shape or right angle, four cornered shape, of leather or other suitable material, in contradistinction to round or flat belting, as india-rubber, india-rubber and canvas, so that either of its four corners or angles shall fit into a right-angle grooved-edge wheel, the object of which is to secure the advantage of running from one pulley to another in a diverging line, or out of a true parallel or right-angle line, to allow of a traversing a greater or less distance in a direction to or fro from a true line from the driving-pulley, and at the same time to produce full surface-bearing of two sides of the belt, and avail of the well-known increase of friction consequent upon an angular face, which cannot be done with the common flat-surface belting, nor with such freedom from slip with a round belt.

Figure 2:
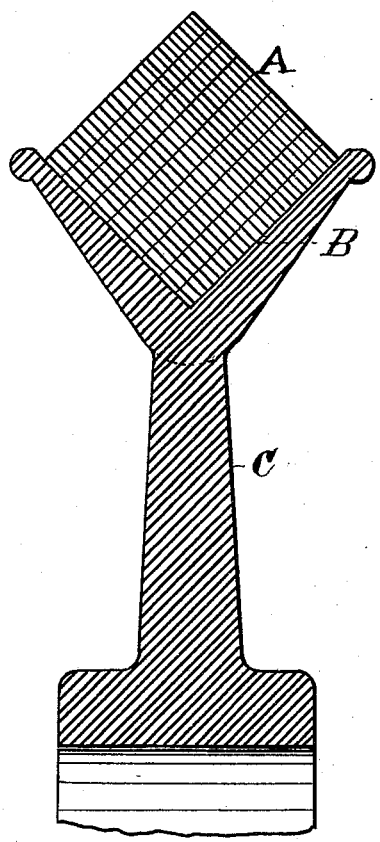

In the accompanying drawings, Figure 1 is a sectional view of this improvement in perspective. Fig. 2 is a cross-section of a groove-wheel, showing the end of the belt.

A is a belt made of leather, nearly square, secured together in the common way with glutinous material, pegs, nails, &c., of thicknesses of leather to form the required size. The ends are properly lapped when required to form an endless belt for service, and secured together in the common way.

This belt may be made of india-rubber or other elastic substance, or india-rubber and canvas. This belt can readily be changed, so that either of its four angles may work in the angle-groove B on the arm C of the pulley shown in cross-section, thereby producing free and perfect elasticity to the belt.

By the use of this belt I am enabled to accomplish what cannot be accomplished, as above stated, by the common belting.

What I claim, and desire to secure by Letters Patent, is—

As an improved manufacture of belting, an angular or nearly square belt, substantially as shown and set forth.

CHARLES A. JEWELL. [L. S.]

Witnesses:
S. D. RAYMOND,
JEREMY W. BLISS.